May 10, 1927.
O. H. FLODIN
METHOD OF MAKING OPHTHALMIC MOUNTINGS
Filed Aug. 17, 1925
1,628,586
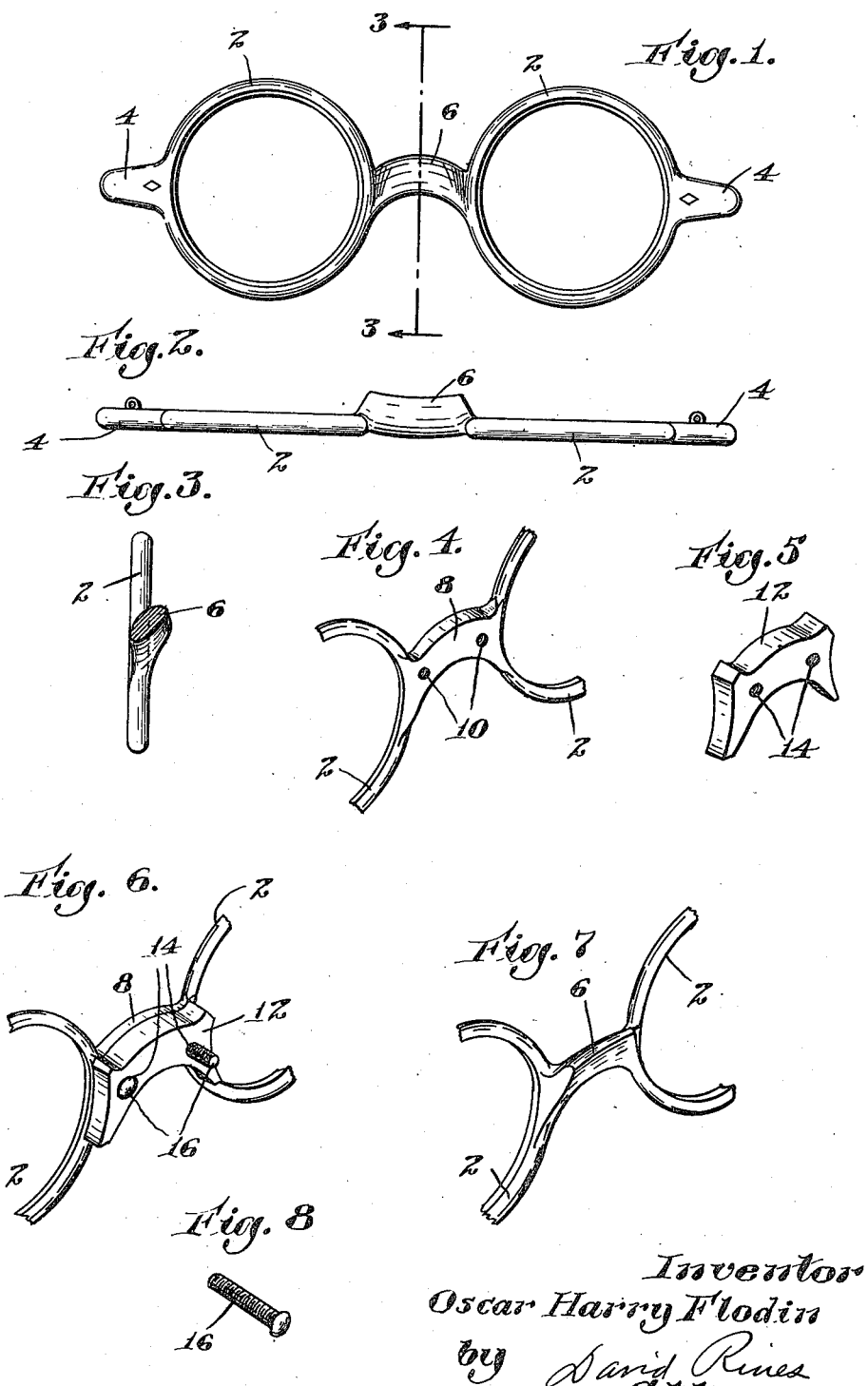
Inventor
Oscar Harry Flodin
by David Rines
Attorney Patented May 10, 1927.

1,628,586

UNITED STATES PATENT OFFICE.

OSCAR HARRY FLODIN, OF ROCHESTER, NEW YORK, ASSIGNOR TO BAUSCH AND LOMB OPTICAL COMPANY, OF ROCHESTER, NEW YORK, A CORPORATION OF NEW YORK.

METHOD OF MAKING OPHTHALMIC MOUNTINGS.

Application filed August 17, 1925. Serial No. 50,544.

The present invention relates to methods of making ophthalmic mountings, and more particularly the lens-holding fronts of ophthalmic mountings of the type constituted of non-metal material, like zylonite.

Lens holding fronts of the above-described character are ordinarily made by suitably treating a sheet of the non-metal material. The front is first shaped out of the sheet, the lens-holding eyes are stamped out of the shaped article, and the bridge is die-shaped, when necessary, to provide an inset or an outset construction. An outset bridge is required when the wearer's nose is so prominent that the lens-holding rims would be positioned too far from his eyes if an on-plane front were employed; and an inset bridge, similarly, makes it possible to hold the lens-holding rims farther away from the wearer's eyes, and thus prevent his eyelashes rubbing against the lenses. But die-shaping has its limitations and frequently it becomes necessary to make a bridge that is farther away from the plane of the lenses than can be produced in this manner.

It is an object of the present invention, therefore, to provide an improved method of making ophthalmic mountings of the above-described character.

The invention will now be explained in connection with the accompanying drawings, in which Fig. 1 is a front elevation of a lens-holding front constructed in accordance with a preferred embodiment of the present invention; Fig. 2 is a plan of the same; Fig. 3 is a section taken upon the line 3—3 of Fig. 1, looking in the direction of the arrows; Figs. 4, 5, 6 and 7 are perspective views illustrating successive steps of the method of the present invention, and Fig. 8 is a view of a detail.

The illustrated ophthalmic mounting comprises two lens-holding rims 2 each having an end piece 4 and connected by a bridge, the whole cut from a flat sheet of zylonite or like non-metal material. It will be assumed, for the purpose of explaining the invention, that it is desired to provide this mounting with an inset bridge 6. The bridge portion 8 of the zylonite sheet is first provided with one or more threaded openings 10, as shown more particularly in Fig. 4. Two openings are preferred, one near each lens-holding rim. A flat zylonite blank 12, Fig. 5, provided with correspondingly positioned threaded openings 14, is cemented to the bridge portion 8, in face-to-face contact therewith, as shown in Fig. 6, and zylonite plugs 16, previously coated with the cement, are then threaded into and through the aligned openings 10 and 14. If desired, the aligned threaded openings 10 and 14 may be provided in the combined members 8 and 12 after they have first been cemented together. The cement employed may be a zylonite solvent, such as acetone. The cemented parts are securely clamped together. When the cement dries, therefore, the parts become welded together in an integral whole. The resulting bridge formed by the portion 8 and the blank 12 is considerably thicker than the thickness of the bridge portion 8 alone. It now remains to cut off the projecting portions of the plugs 16 and to shape the resulting bridge into the desired shape 6, as indicated in Fig. 7. This may be done in any desired way, as by skiving or cutting, and the final product is polished. The inset portion of the bridge will be found to be very securely fastened to the bridge portion 8 by the cement and the plugs 16, yet no trace will be visible of the junction between the parts 8 and 12.

Modifications will readily occur to persons skilled in the art, and all such are considered to fall within the spirit and scope of the invention as defined in the appended claims:

What is claimed is:

1. A method of making an article of the class described that comprises extending a zylonite member through and beyond two zylonite members to secure the said two members together, removing the portion of the first-named member that projects beyond said two members, and shaping the secured-together members into predetermined form.

2. A method of making an article of the class described that comprises cementing two zylonite members together, providing the cemented-together members with a threaded opening, screw-threading a cement-covered zylonite screw-threaded member into and through the opening, removing the portion of the screw-threaded member that projects beyond the cemented-together members, and shaping the cemented-together members into predetermined form.

3. A method of making an ophthalmic mounting that comprises securing a blank to the bridge of a lens-holding front having two lens-holding rims connected by the said bridge, and shaping the bridge and the blank secured thereto.

4. A method of making an ophthalmic mounting that comprises securing a non-metal blank to the bridge of a lens-holding front constituted of non-metal material and having two lens-holding rims connected by the said bridge, and shaping the bridge and the blank secured thereto.

5. A method of making an ophthalmic mounting that comprises cementing a zylonite blank to the bridge of a lens-holding front constituted of zylonite and having two lens-holding rims connected by the said bridge, and shaping the bridge and the blank cemented thereto.

6. A method of making an ophthalmic mounting that comprises extending a member through and beyond a blank and the bridge of a lens-holding front having two lens-holding rims connected by the said bridge to secure the blank and the bridge together, removing the portion of the member that projects beyond the bridge and the blank and shaping the bridge and the blank secured thereto.

7. A method of making an ophthalmic mounting that comprises cementing a zylonite blank to the bridge of a lens-holding front constituted of zylonite and having two lens-holding rims connected by the said bridge, providing the cemented-together bridge and blank with a screw-threaded opening, screw-threading a cement-covered zylonite screw-threaded member into and through the opening, removing the portions of the screw-threaded zylonite member that projects beyond the cemented-together bridge and blank, and shaping the cemented-together bridge and blank into predetermined form.

8. A method of making an ophthalmic mounting that comprises cementing a flat zylonite blank to the flat bridge of a lens-holding front constituted of a flat sheet of zylonite and having two lens-holding rims connected by the said bridge, providing the cemented-together bridge and blank with a screw-threaded opening positioned near each lens-holding rim, screw-threading a cement-covered zylonite screw-threaded member into and through each opening, removing the portions of the screw-threaded members that project beyond the cemented-together bridge and blank, and shaping the cemented-together bridge and blank into predetermined form.

In testimony whereof, I have hereunto subscribed my name.

OSCAR HARRY FLODIN.